US008212543B2

(12) United States Patent
Kenly et al.

(10) Patent No.: US 8,212,543 B2
(45) Date of Patent: Jul. 3, 2012

(54) METHOD AND SYSTEMS FOR CONDUCTION MODE CONTROL

(75) Inventors: Stewart Kenly, Epping, NH (US); Paul W. Latham, II, Lee, NH (US)

(73) Assignee: L&L Engineering, LLC, Lee, NH (US)

( * ) Notice: Subject to any disclaimer, the term of this patent is extended or adjusted under 35 U.S.C. 154(b) by 0 days.

(21) Appl. No.: 13/157,874

(22) Filed: Jun. 10, 2011

(65) Prior Publication Data
US 2011/0234190 A1   Sep. 29, 2011

Related U.S. Application Data

(62) Division of application No. 12/119,905, filed on May 13, 2008, now Pat. No. 7,986,135.

(51) Int. Cl.
G05F 1/40 (2006.01)
(52) U.S. Cl. ........................................ 323/285; 323/282
(58) Field of Classification Search .................. 323/222, 323/225, 268, 271, 282–285
See application file for complete search history.

(56) References Cited

U.S. PATENT DOCUMENTS

| | | | | |
|---|---|---|---|---|
| 5,170,333 | A | 12/1992 | Niwayama | 363/21 |
| 5,457,624 | A | 10/1995 | Hastings | 363/127 |
| 5,654,648 | A * | 8/1997 | Medhekar et al. | 326/17 |
| 6,459,602 | B1 | 10/2002 | Lipcsei | 363/132 |
| 6,621,256 | B2 | 9/2003 | Muratov et al. | 323/282 |
| 6,813,173 | B2 | 11/2004 | Lipcsei | 363/98 |
| 6,979,987 | B2 | 12/2005 | Kernahan et al. | |
| 7,072,198 | B2 | 7/2006 | Krug et al. | 363/127 |
| 7,471,072 | B2 | 12/2008 | Fogg et al. | 323/284 |
| 7,557,545 | B2 | 7/2009 | Naka et al. | 323/223 |
| 7,595,624 | B2 | 9/2009 | Tateishi et al. | 323/288 |
| 7,876,078 | B2 * | 1/2011 | Gray et al. | 323/282 |
| 2007/0112443 | A1 | 5/2007 | Latham et al. | 700/29 |
| 2007/0114985 | A1 | 5/2007 | Latham et al. | 323/283 |

OTHER PUBLICATIONS 3A, 1MHz, DDR Memory Termination Supply Datasheet; Rev 1; Sep. 2002; available a http://datasheets.maxim-ic.com/cn/ds/MAX1809.pdf.
International Rectifier Data Sheet No. PD60235_B, Jun. 15, 2006, available at http://www.irf.com/product-info/datashets/data/ips1011.pdf.
Sebastian, J. et al., The determination of the boundaries between continuous and discontinuous conduction modes in PWM DC-to-DC converters used as power factor preregulators. 23rd Annual IEEE Power Electronics Specialists Conference, 1992, pp. 1061-1070, vol. 2.
Strawser, R.E. et al., Analysis of a buck PVVM DC-DC converter in discontinuous conduction mode. Proc. of the IEEE 1994 National Aerospace and Electronics Conference, 1994, pp. 35-42, vol. 1.
Sadarnac, D. et al., The double discontinuous mode operation of a converter: a method for soft switching, IEEE Transactions on Power Electronics, vol. 19, Issue 2, Date: Mar. 2004, pp. 453-460.
Ferdowsi, M. et al., Estimative current mode control technique for DC-DC converters, operating in discontinuous conduction mode. IEEE Power Electronics Letters, vol. 2, Issue 1, Mar. 2004, pp. 20-23.

(Continued)

Primary Examiner — Matthew Nguyen

(57) ABSTRACT

Methods for selecting between the two modes (states) of operation, continuous conduction and discontinuous conduction, are disclosed. Systems that are capable of selecting the operating mode and operating in the continuous conduction mode or the discontinuous conduction mode are also disclosed.

18 Claims, 14 Drawing Sheets

OTHER PUBLICATIONS

Chin, T.-H. et al., About the distinctive characteristics of DC-DC switch-mode converters under discontinuous conduction mode. 4th International Power Electronics and Motion Control Conference, 2004, vol. 1, pp. 197-200.

* cited by examiner

NOTE: ZC is defined as Zero Crossing

METHOD AND SYSTEMS FOR CONDUCTION MODE CONTROL

CROSS-REFERENCE TO RELATED APPLICATIONS

This application is a divisional application of U.S. patent application Ser. No. 12/119,905, filed May 13, 2008, the disclosure of which is incorporated herein by reference in its entirety.

BACKGROUND

This invention relates generally to conduction mode control in switching converters.

A switching power converter is a multi-port network having at least two ports, at least one of which is an input and at least one of which is an output. Inputs absorb electrical power from an external source; outputs deliver electrical power to an external load. The converter is typically a network of reactive elements, switching elements and, in addition, and sometimes one or more transformers. The reactive elements include at least one inductor, and possibly one or more capacitors. The switching elements include at least one externally-controlled switch. The externally-controlled switches are driven by a control circuit which adjusts the duty cycle of the switches and possibly the timing relationships between various switches so as to regulate the flow of electrical power through the converter. The converter will assume each of its topological configurations as determined by the control circuit. The mode of operation of the converter may also be continuous or discontinuous. In a continuous mode of operation, the inductor always carries an electric current. Conversely, in the case of a discontinuous mode of operation, the switch is activated again only after the discharge current of the inductance has become null.

One typical converter topology is a buck converter. Traditional buck topology DC to DC converters, shown in FIG. 1a, utilize a "freewheeling" diode (35) as a return path for when the energizing switch (26) is open. This is also true for other topologies including forward, flyback and boost. When the load current is high enough the inductor current always flows from the power supply to the load. In this case, either the source switch (26) is on or the inductor current forces the freewheeling diode (35) on. At light loads, the inductor is discharged to a point that it reaches zero current. At this time the freewheeling diode is reversed biased and no longer conducts. This can be seen in FIG. 1. There are advantages and disadvantages to these two modes of operation. The primary advantage is that at light load the inductor current is lower and thus the efficiency is higher. The primary disadvantage is that current cannot be removed from the load and results in overcharging the output capacitor. The only current removal mechanism is the load itself. This results in a slow transient response.

To maintain high efficiency and high load currents and/or low output voltages, buck regulators, as shown in FIG. 2, commonly use mosfet switch (28) instead of a diode. The low side (LS) mosfet switch is termed a synchronous rectifier. One method to control the synchronous rectifier is to drive it with the complement of the source side control with the provision being that there is a non overlap time to control cross conduction or shoot-through. The primary advantage of this approach is much higher efficiency at high loads and faster trends in response because the output capacitor can be actively discharged.

It would be desirable to have Synchronous rectifier operation at high loads during continuous inductor current conduction and diode like operation with light loads during discontinuous inductor conduction. There are conventional designs that attempt this mode of operation.

One conventional method ensures that the inductor current is always positive, in the direction of the load; hence the supply is always in continuous conduction. In this method, the inductor current is modeled by a circuit, either analog or digital, and the time at which the discharging inductor current reaches zero is predicted as in FIG. 3. At the predicted time, the synchronous rectifier is turned off. Because the voltage across the inductor is dominated by the change in the switch node, the derivation of the inductor current can assume that the output voltage is constant during one PWM cycle. This assumption must be valid for a useful power supply with a small output voltage ripple.

In another conventional method, the current in the synchronous rectifier is measured by monitoring the voltage drop across the synchronous rectifier during the time when it is on. When the current reaches zero the synchronous rectifier is turned off until the next pulse width modulation, PWM, cycle. One disadvantage of this method, is that for high efficiency power supplies the voltage across the synchronous rectifier is very small. This is particularly true for systems that use low on resistance external mosfets. In that case, the voltage drop across the synchronous rectifier caused by the inductor ripple current may only be a few millivolts. This small signal is very difficult to measure with a low delay. The comparator required for this task is costly and requires significant power. In addition, the comparator power source commonly has significant noise due to the fast switching speeds and high power levels. This noise can easily trip the negative current comparator and cause erroneous operation.

BRIEF SUMMARY

In some embodiments of switching converters, the system experiences decreased efficiency at light loads due to wasted energy in the inductor. This energy is removed from the inductor by the synchronous rectifier when the current reverses direction and returned to the input supply. Energy transfer typically has loss. This is due to many factors including resistance, magnetic core loss, switching loss. Unneeded energy transfer should be avoided in embodiments that have efficiency as a goal. As load current increases, negative inductor current decreases until a state called critical conduction is reached. When critical conduction is reached and while in the critical conduction mode (state), the inductor current becomes and remains positive. In order to increase efficiency at light loads, it is desirable to create a state of operation, referred to as discontinuous conduction, where inductor stops conducting and negative current is minimized.

Embodiments of the method of these teachings for selecting between the two modes (states) of operation, continuous conduction and discontinuous conduction, are disclosed hereinbelow.

Embodiments of the system of these teachings that are capable of selecting the operating mode and operating in the continuous conduction mode or the discontinuous conduction mode are also disclosed.

For a better understanding of the present teachings, together with other and further needs thereof, reference is made to the accompanying drawings and detailed description and its scope will be pointed out in the appended claims.

DETAILED DESCRIPTION

Figure 1:
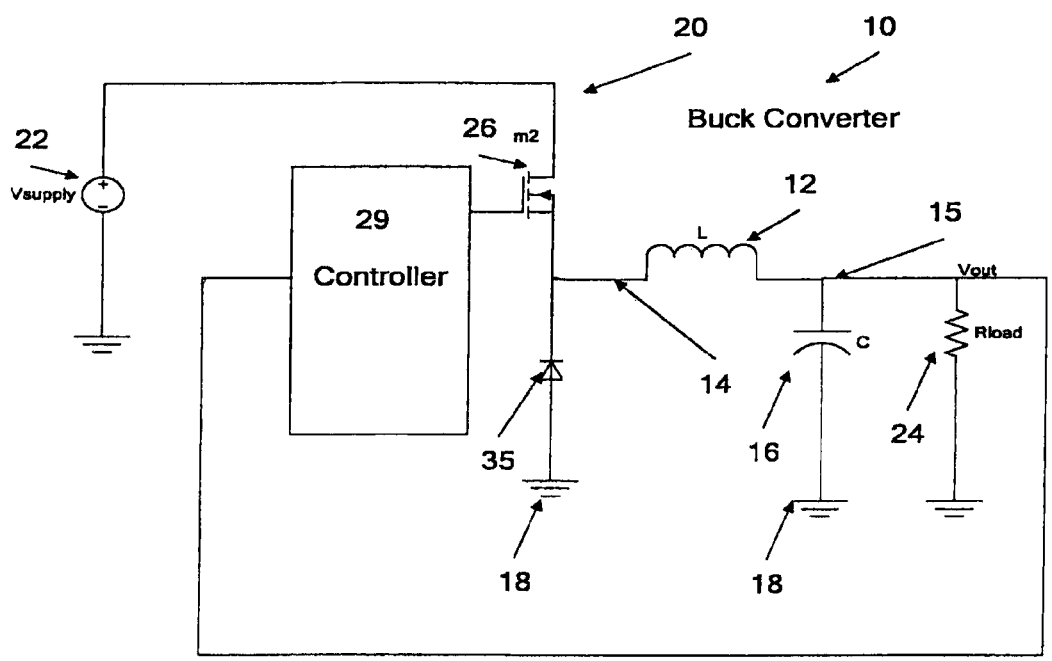
FIG. 1 depicts a conventional switching converter.
Figure 2A:
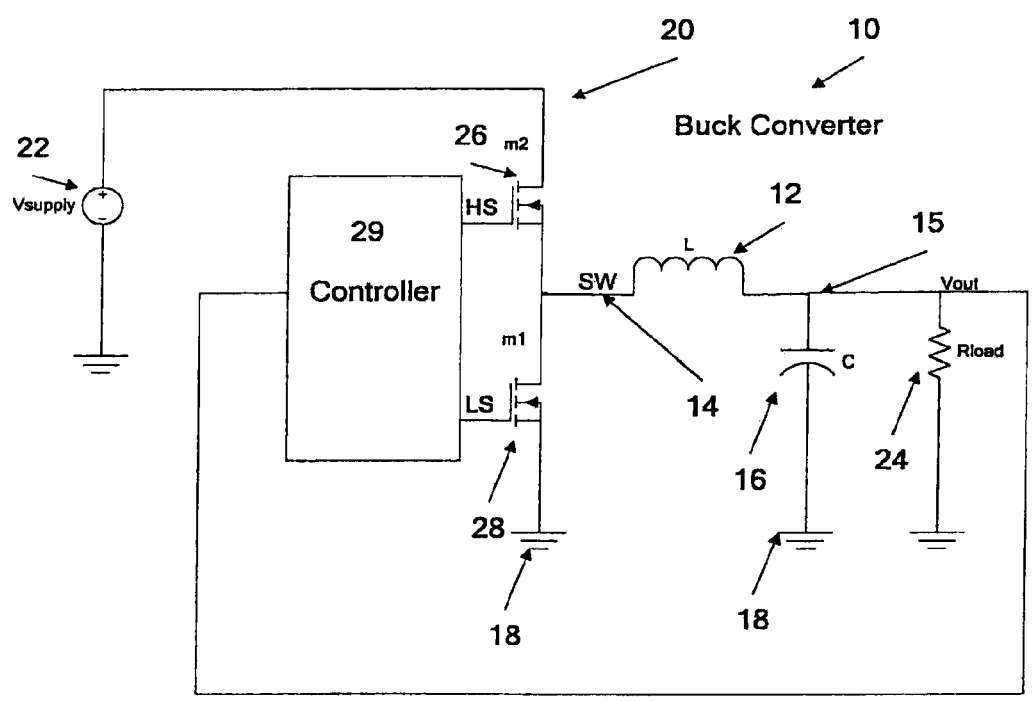
FIGS. 2a, 2b depict another conventional switching converter and the corresponding waveform diagram.
Figure 2B:
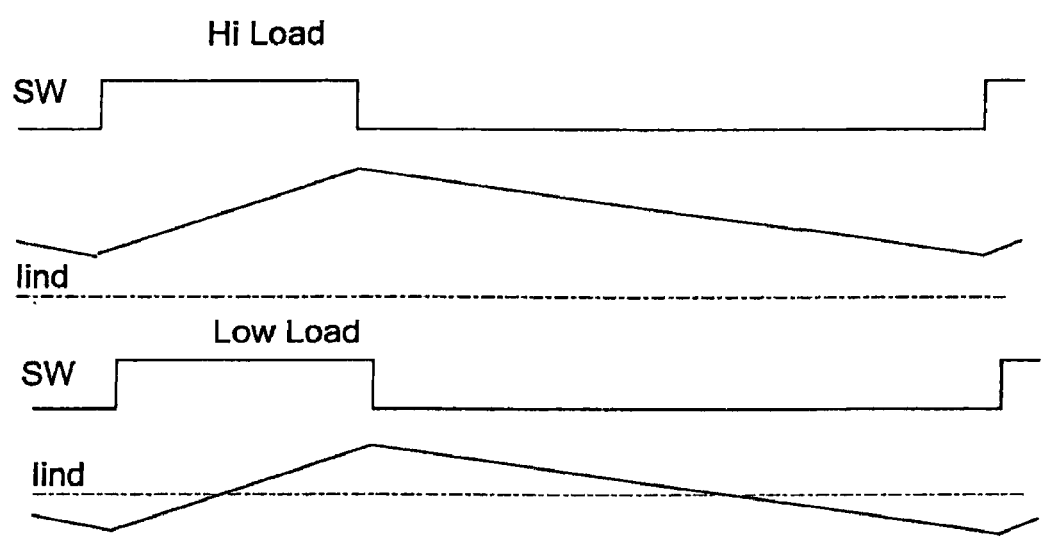
Figure 3:
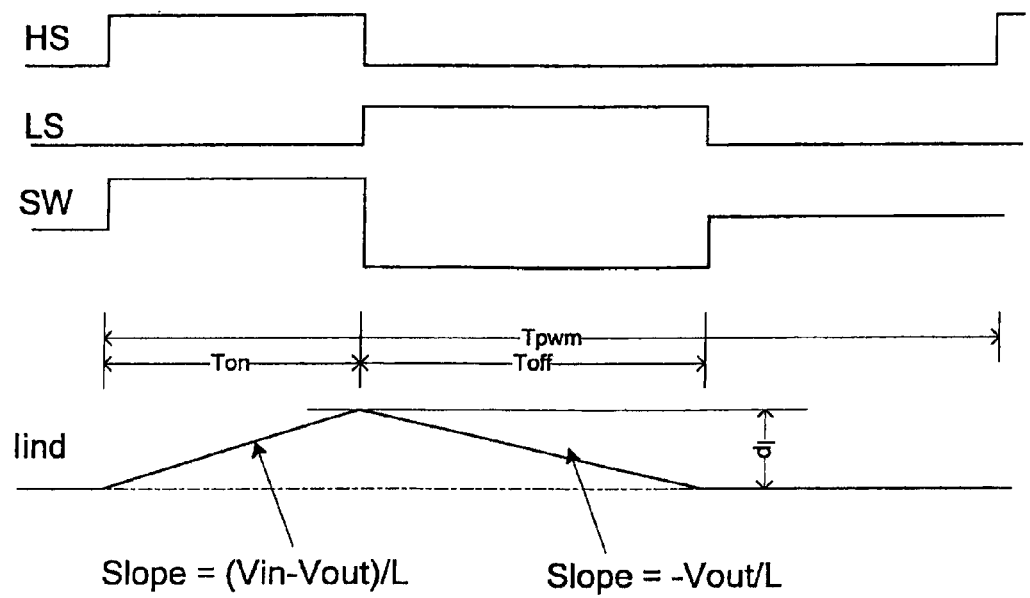
FIG. 3 is a graphical schematic representation of timing diagrams for a switching converter.
Figure 4A:
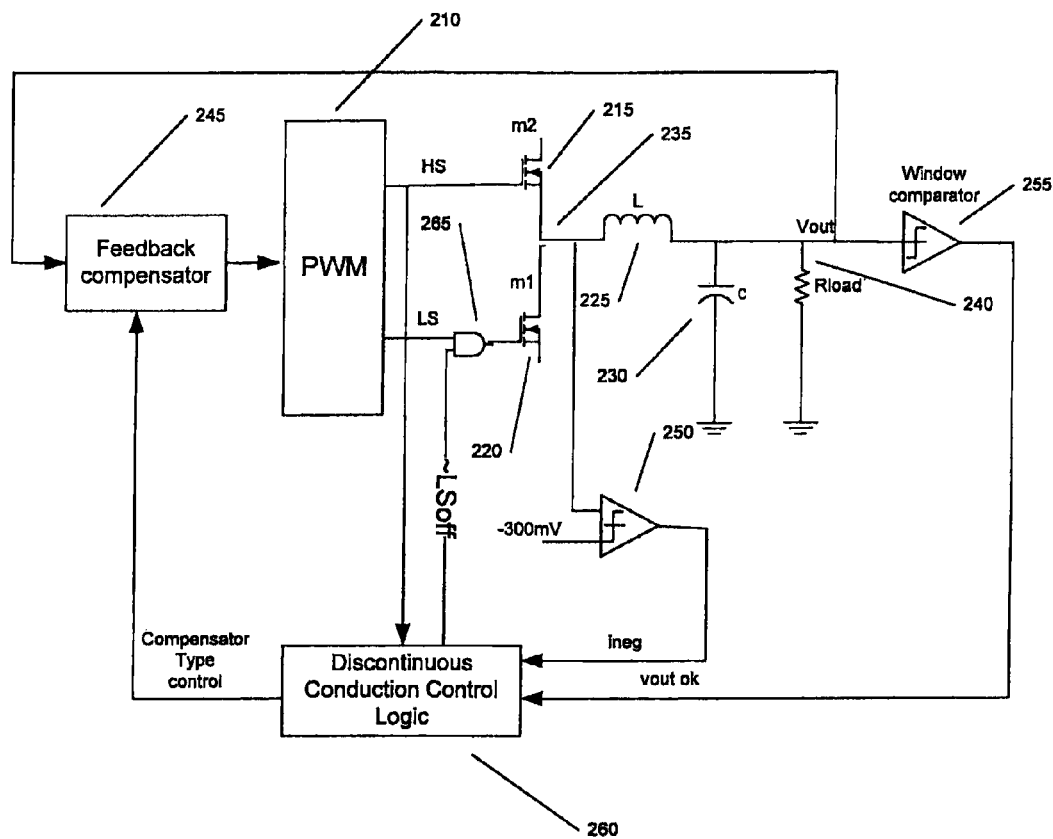
FIG. 4a is a graphical schematic representation of an embodiment of the system of these teachings.

In the embodiments described hereinbelow, the following quantities, defined in relation to FIG. 3, are utilized:

$$Ip = Ton\frac{Vin - Vout}{L} = Toff\frac{Vout}{L}$$
$$Toff = Ton\frac{Vin - Vout}{Vout}$$
$$Toff + Ton = Ton\frac{Vin}{Vout},$$

where Toff,Ton are defined as in FIG. 3, Ip is the inductor current, Vin,Vout are the input and output voltage, respectively, of a circuit having at least two reactive components, one of which is an inductor (see, for example, FIG. 4a).

It should be noted that, although the embodiments shown hereinbelow utilize a buck topology, these teachings are not limited only to that topology.

Figure 5:
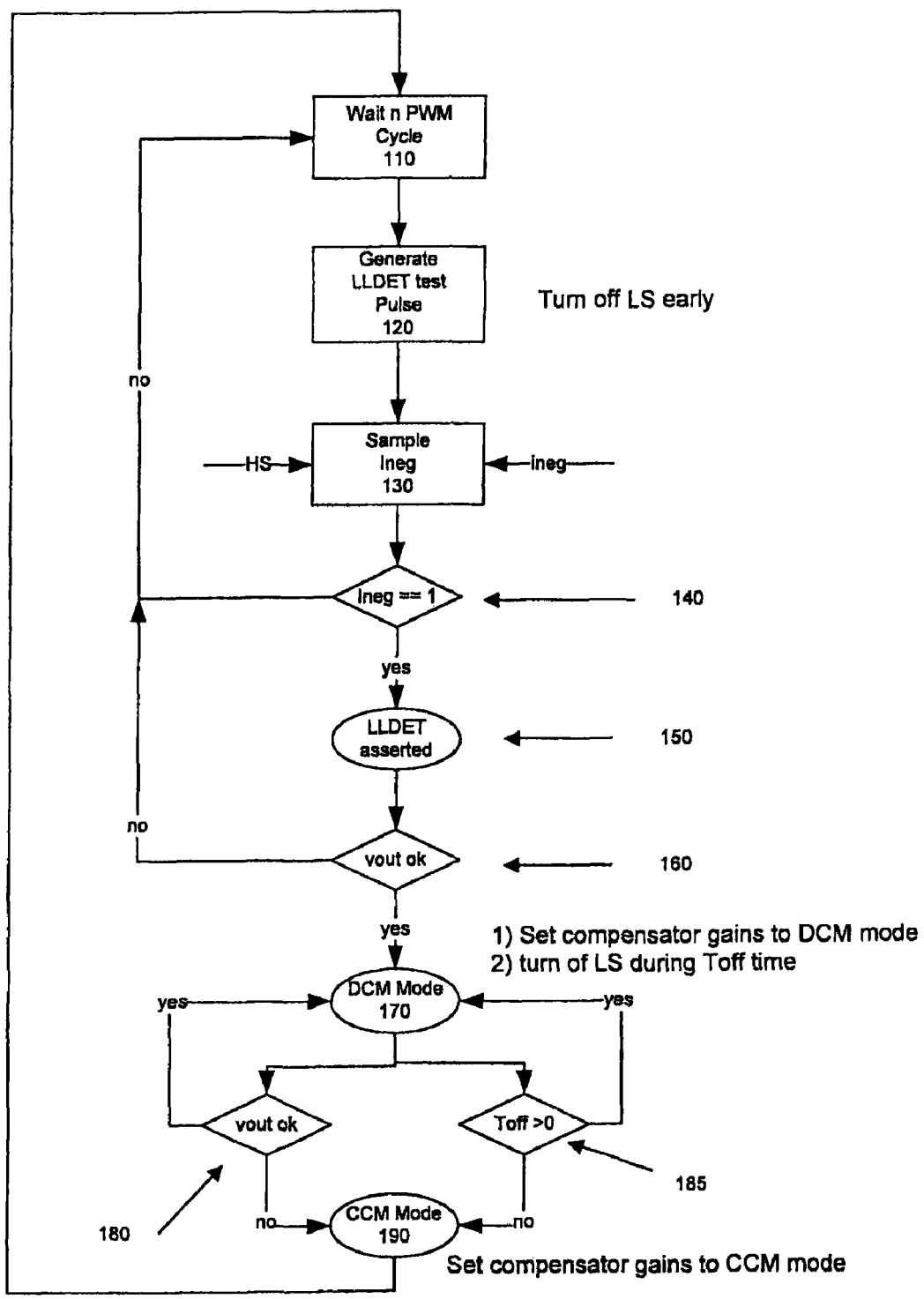
FIG. 5 is a block diagram schematic representation of an embodiment of the method of these teachings.
Figure 6:
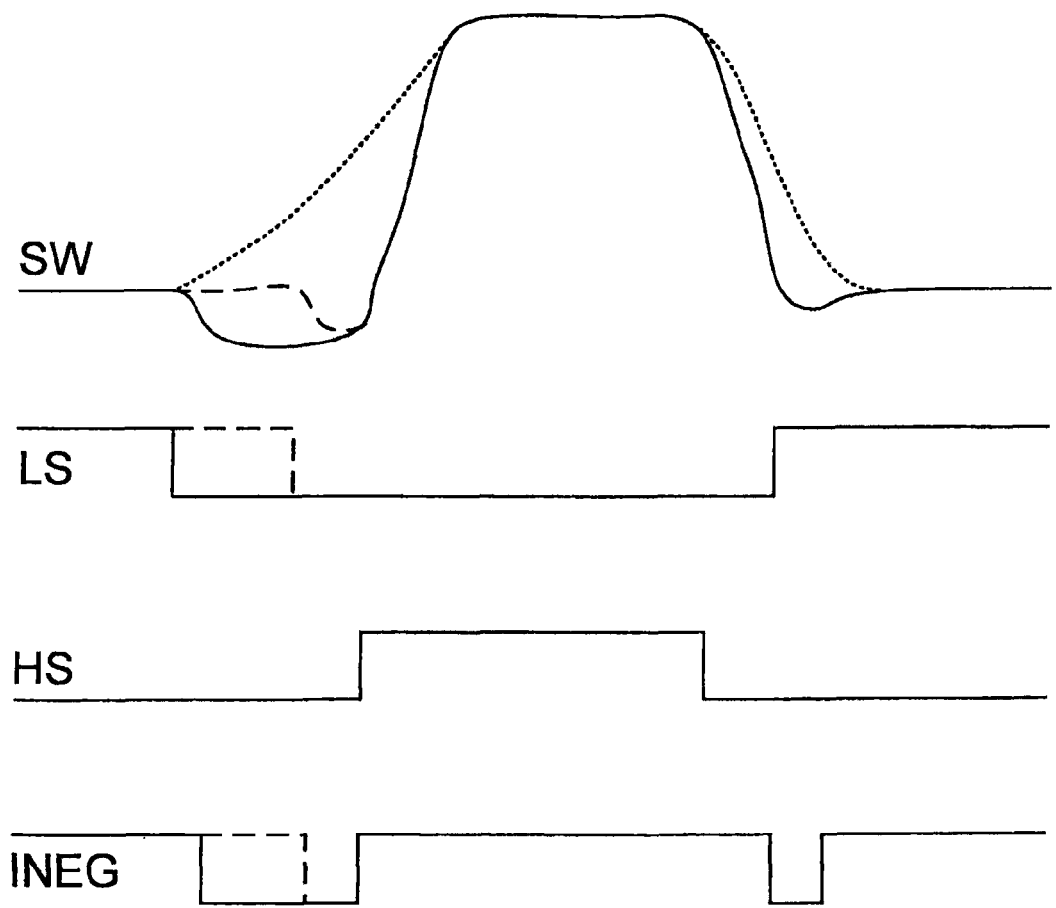
FIG. 6 is a graphical schematic timing diagram depicting timing features of operation of one embodiment of the system of these teachings.

One embodiment of the method of these teachings for selecting between the two modes (states) of operation, continuous conduction and discontinuous conduction, is shown in FIG. 5. Referring to FIG. 5, while in the continuous conduction mode (referred to as CCM), calibration measurements are performed at a rate smaller than a cycle rate (for example, calibration measurements are performed after a number "n" of PWM cycles, step 110, FIG. 5) and an indicator of low load conditions is determined from the calibration measurements. In another embodiment, when it is known by any other means that the load current has or is likely to change significantly (see for example U.S. Patent Application Publication No. 2007-0114985-A1 or U.S. Patent Application Publication No. 2007-0112443-A1, both of which are incorporated by reference in their entirety) or a large transient load is detected by noting a change in duty cycle, the calibration cycle is performed. In one embodiment, performing the calibration measurements includes turning off a synchronous rectifier (LS) control signal before a scheduled time (step 120, FIG. 5) and the indicator of low load conditions is obtained by measuring a voltage at the switch node, comparing the measured voltage to a predetermined negative threshold. If the output of the comparator is high (If the output of the comparator is low, it indicates that the system is not in lightload conditions; if the output of the comparator is high, the body diode of the synchronous rectifier is off, which indicates that the system is in lightload conditions), the indicator of low load conditions is provided. In the instance where the result of comparing the measured voltage to the predetermined threshold is labeled "ineg," the obtaining of the indicator of low load conditions includes sampling "ineg" (step 130, FIG. 5) and determining if an "ineg" value indicates that low load conditions are present (step 140, FIG. 5). If the "ineg" value satisfies a predetermined criterion, the indicator of low load conditions is asserted (step 150, FIG. 5). (In one embodiment, the Ineg pulse is negative as shown in FIG. 6, when ineg=1, pulse is not present, indicating that the supply is below critical conduction. If ineg=0, body diode conduction is present and the supply is above critical conduction.) It is then determined whether the output voltages within predetermined tolerances (step 160, FIG. 5). If the output voltages within tolerances and the indicator of low load conditions has been asserted, the system is placed in the discontinuous conduction mode (referred to as DCM mode or state) (step 170, FIG. 5). While in the discontinuous conduction mode (state), compensator parameters (gains) for a feedback compensator for the system maybe set to a predetermined group of gains optimized for discontinuous conduction mode and the synchronous rectifier (LS) is turned off during the time that the inductor current is set to zero (Toff). If it is determined, during the discontinuous conduction mode (DCM), that the output voltage is not the within the predetermined tolerances (step 180, FIG. 5) or that the inductor current does not reach substantially zero before a cycle time, (if, as defined in FIG. 3, Ton+Toff is >=Tpwm, DCM mode is exited, decision block labeled as Toff is equal to or less than zero, step 185, FIG. 5), the system is placed back to the continuous conduction mode (step 190, FIG. 5). While the continuous conduction mode, the feedback compensator parameters (also referred to as gains) are set to parameters corresponding to the continuous conduction mode and the method reverts to the beginning (back to step 110, FIG. 5).

One embodiment of a switching converter including embodiments of the teachings of this invention is shown in FIG. 4a. It should be noted that although an exemplary embodiment of, the switching converter is shown in FIG. 4a, the present teachings are not limited to only that exemplary embodiment. Referring to FIG. 4a, the switching converter shown therein includes a high side (HS) switch 215 for coupling a node 235 to an input voltage, a low side (LS) switch 220 for coupling the node 235 to a ground reference voltage, the LS switch operating as a synchronous rectifier, and a circuit including two or more reactive components, one of the reactive components being an inductor 225, the circuit being configured to provide an output voltage and being switchable between at least two voltage states; the input node of the circuit being connected to the node 235. In the embodiment shown, the other reactive component is a capacitor 230. The switching converter shown in FIG. 4a also includes a pulse controller 210 for providing, to the HS switch 215, a control signal (HS) for controlling the HS switch 215, and of providing, to the LS switch 220, another control signal for controlling the LS switch 220, a feedback compensator component 245 receiving a signal indicative of output voltage 240 from the circuit and providing feedback compensation signals to the pulse controller 210, a comparator component 250 receiving a signal indicative of node voltage at the node 235, the comparator component generating an indicator of low load conditions, a threshold comparator component 255 receiving the signal indicative of output voltage 240, the threshold comparator component generating another indicator, the other indicator of being indicative of whether the signal indicative of output voltage 240 is within a predetermined range, and a conduction mode control component 260 receiving the indicator of low load conditions and the other indicator, the conduction mode control component providing compensator parameters to the feedback compensator and providing a command signal for turning off the other control signal for controlling the LS switch 220. The command signal is provided to a logic component 265, the logic component 265 also receives the control signal (LS) for controlling the LS switch 220 and the logic component provides a resulting control signal to the LS switch 220.

Figure 4B:
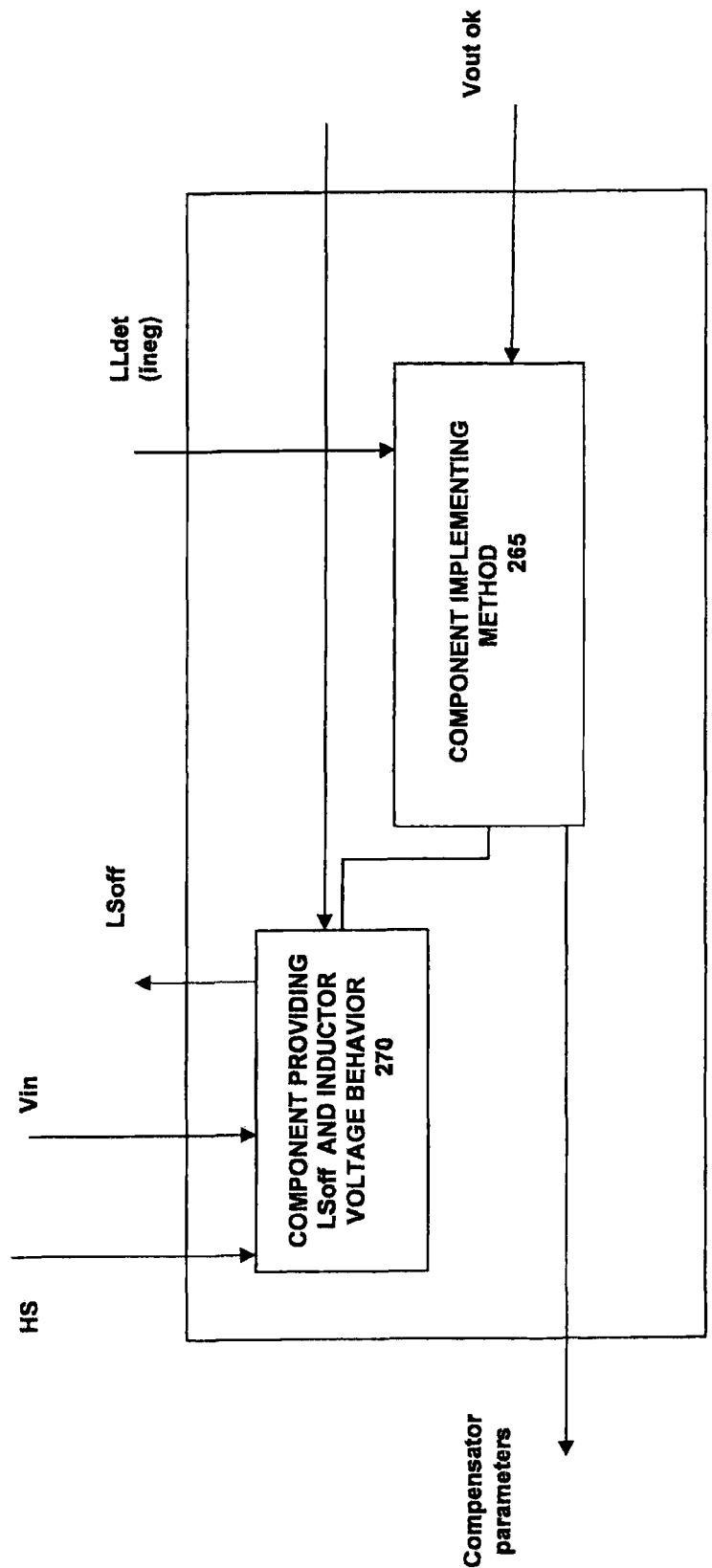
FIG. 4b is a graphical schematic representation of a component of an embodiment of the system of these teachings.

In one embodiment, shown in FIG. 4b, the conduction mode control component 260 includes a first subcomponent 270 receiving the controller provided high side switch control signal (HS), the signal indicative of switch node voltage and the signal indicative of output voltage, the first subcomponent 270 providing the command signal(LSoff) for turning off a synchronous rectifier (LS) control signal and a signal indicative of time of inductor current zero crossing and a second subcomponent 265 receiving the indicator of low load conditions, the indicator of output voltage within predetermined tolerances and the signal indicative of time of inductor current zero crossing, the second subcomponent providing a determination of whether the switching converter is in continuous conduction mode or discontinuous conduction mode, and of providing outputs corresponding to the determined conduction mode. During the continuous conduction mode the output of the second subcomponent 265 includes a signal indicative of compensator parameters corresponding to the continuous conduction mode and a signal indicating initiation of calibration measurements.

In one embodiment, the calibration block initiates calibration cycle when a PWM cycle counter reaches a pre-determined value. In another embodiment, control logic that monitors output voltage and current and determines when significant change that warrants calibration. When started, the calibrate circuit causes the LS signal to turn off early as indicated in FIG. 6. By effectively increasing the dead-time between LS falling and HS rising, body diode conduction is obtained if the circuit is above critical conduction. The body diode current will manifest itself as a negative switch node voltage and will cause the ineg comparator output to go low. If the circuit is at or below critical conduction, the switch node will not go negative resulting in no ineg comparator pulse. In one embodiment, a blanking circuit is utilized to ensure that no other negative switch node voltages cause erroneous light load events. (Critical conduction is the point at which the switch node becomes influenced by LS instead of HS.)

Figure 8:
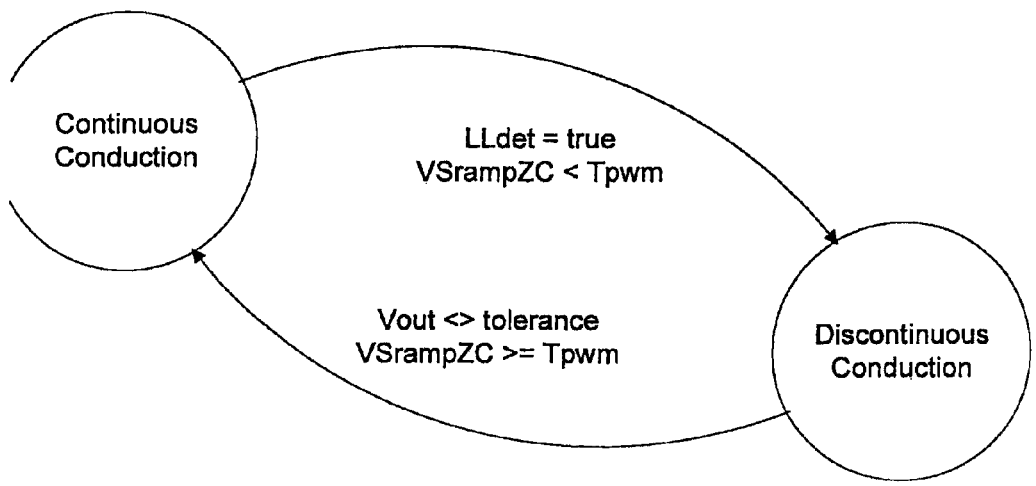
FIG. 8 is a schematic representation of a state diagram in one embodiment of the system of these teachings.

Since there are two desired states (modes) of operation, in one embodiment the second subcomponent 265 includes a state machine, as shown in FIG. 8, which is utilized to determine whether the system whether it is in the discontinuous conduction mode or continuous conduction mode. The state machine can be implemented utilizing conventional logic components.

Other embodiments of the second subcomponent 265 are within the scope of these teachings. The second subcomponent 265 implements the method of these teachings for selecting between the two modes (states) of operation, continuous conduction and discontinuous conduction. The implementation can be, but not limited to, a dedicated digital component, a field programmable gate array (FPGA), or a processor and a memory having computer readable code embodied therein for implementing the method of this teachings.

Figure 9:
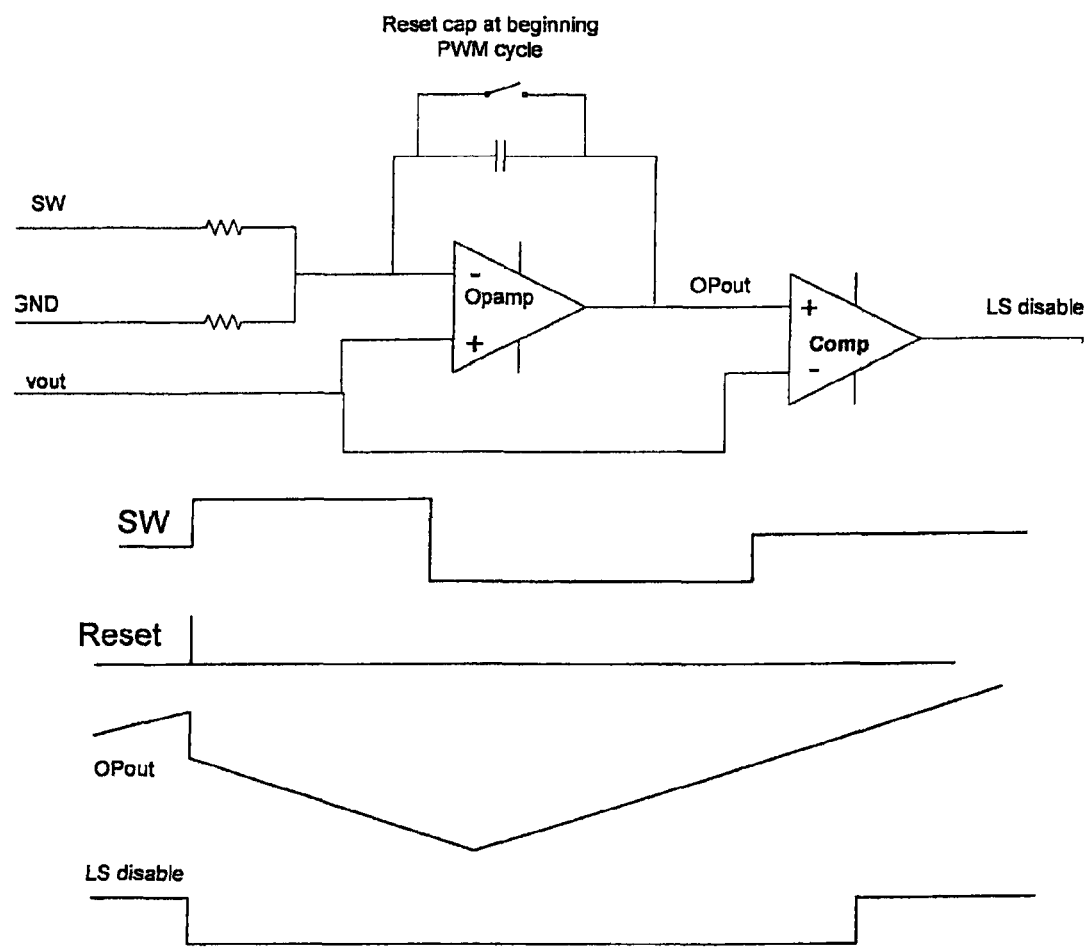
FIG. 9 is a block diagram schematic representation of an embodiment of a component of one embodiment of the system of these teachings.

In one embodiment, shown in FIG. 9, the first subcomponent 270 includes an integrating component 310 receiving a difference of the signal indicative of voltage at the switch node 235 and the signal indicative of output voltage; the integrating component 310 being reset by a rising edge of the controller provided high side switch control signal (HS), and a comparator 320 receiving an output of the integrating component 310 and the signal indicative of output voltage and providing the command signal (LSoff) for turning off a synchronous rectifier (LS) control signal. Shown in FIG. 9 are the timing waveforms for the voltage at the switch node 235 (labeled SW), the output of the integrating component 310 and the command signal (LSoff) for turning off a synchronous rectifier (LS) control signal. The output of the comparator 320 provides the time at which the voltage of inductor substantially crosses zero (VSrampZC). VSrampZC can be compared to the PWM cycle time, the time from one rising edge of the HS control signal to the next rising edge of the HS control signal.

Figure 10:
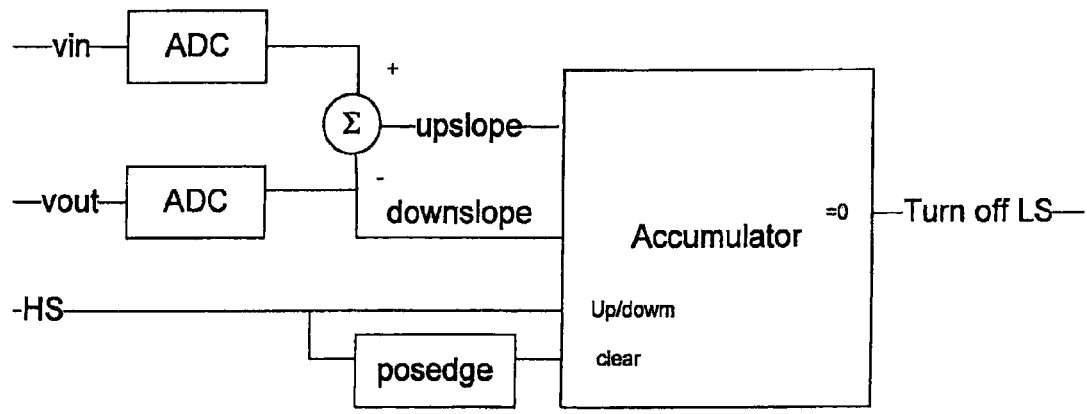
FIG. 10 is a block diagram schematic representation of another embodiment of the component of one embodiment of the system of these teachings.

In another embodiment, shown in FIG. 10, the first subcomponent 270 includes an accumulator (timer) 330 receiving a digitized representation of a signal representative of the difference between the voltage at the switch node 235 and the output voltage during an upcount period., a digitized presentation of a signal indicative of a negative value of the output voltage during the down count period., and the controller provided high side (HS) switch control signal, the controller provided high side switch (HS) control signal determining the upcount period when the HS control signal is high and determining the down count period when the HS control signal is low; a rising edge of the HS control signal being used to reset the accumulator, the accumulator 330 providing the command signal (LSoff) for turning off a synchronous rectifier (LS) control signal; the command signal (LSoff) for turning off a synchronous rectifier (LS) control signal being provided when an accumulator output is substantially zero.

Figure 11:
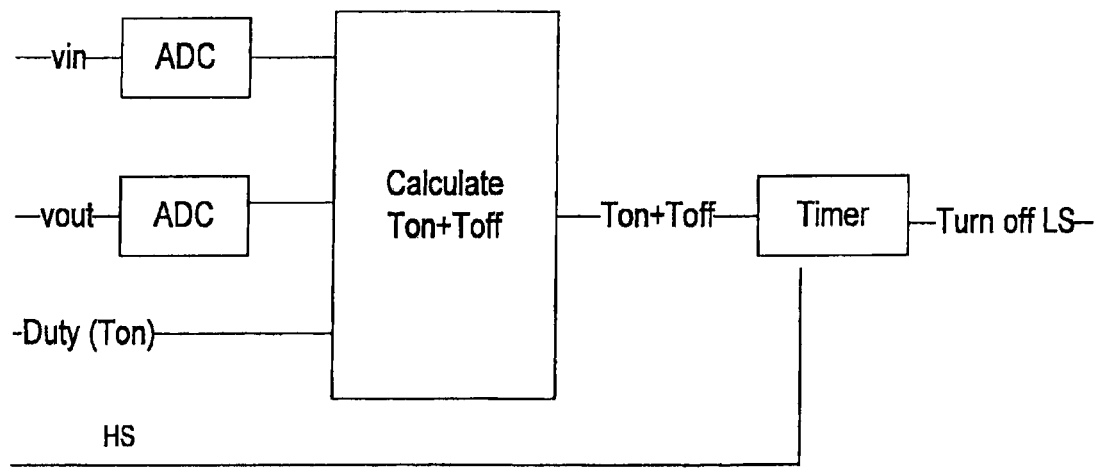
FIG. 11 is a block diagram schematic representation of yet another embodiment of the component of one embodiment of the system of these teachings.

In a further embodiment, shown in FIG. 11, the first subcomponent 270 includes a lookup table component 340 receiving a digital representation of the signal indicative of the voltage at the switch node 235, a digital representation of the signal indicative of output voltage and a signal indicative of a duration time of the controller provided high side switch control signal (HS), the lookup table component 340 providing an output indicative of a sum of a rise time and fall time of inductor current. The embodiment shown in FIG. 11 also includes a component 380 (timer-comparing the output of the lookup table to the cycle time) receiving the output indicative of a sum of a rise time and fall time of inductor current and signal indicative of a cycle time (obtained from the controller provided high side switch control signal (HS)) and providing the command signal for turning off a synchronous rectifier (LS) control signal.

Figure 7:
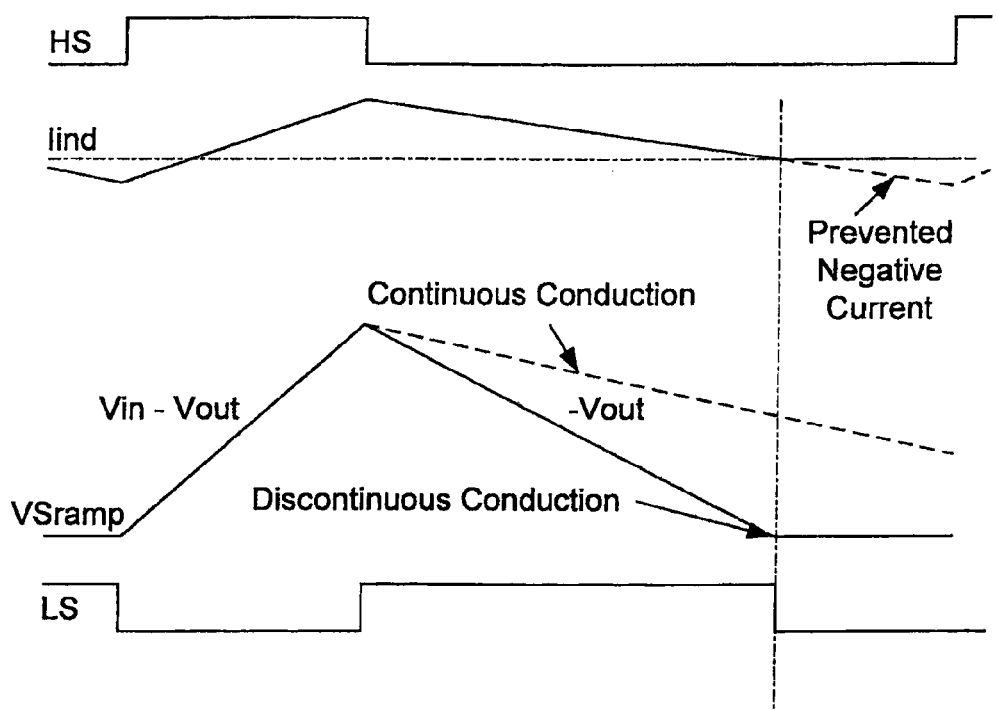
FIG. 7 is another graphical schematic timing diagram depicting other timing features of operation of one embodiment of the system of these teachings.

An exemplary illustration, not a limitation of this teachings of the performance and behavior of an embodiment the system of this teachings is shown in FIGS. 6 and 7. Referring to the timing diagrams shown in FIG. 6, the upper diagram depicts a signal indicative of the voltage at the switch node 235 during the continuous conduction mode in three different situations-two where calibration does occur (the upper, entirely positive curve indicating light load and the solid substantially negative curve indicating heavy load) and one showing normal LS operation with body diode conduction where calibration does not occur, INEG, having different characteristics. In the first condition, depicted by the solid curve, and the LS control signal is turned off and the voltage at the switch node 235 goes negative, the negative voltage being sufficient to produce an indicator of heavy load, MEG, by means of the embodiment of the system of these teachings shown in FIG. 4a. In the second condition, shown by the dashed line, the voltage at the switch node 235 does not go negative, the positive voltage being sufficient to produce an indicator of light load conditions.

In FIG. 7, timing diagrams are depicted showing the inductor current (labeled Iind) which rises when the HS control signal is asserted (positive) and falls when the HS control signal is off. In these situations shown, the inductor current would be negative if the discontinuous conduction mode were not entered. As shown in the third timing diagram, when the discontinuous conduction mode is entered, the inductor current is held at substantially zero. Also at the time when the discontinuous conduction mode is entered, the LS control signal is turned off. The third timing diagram is similar to that obtained in the embodiment of the first subcomponent 270 shown in FIG. 9, being a volt-second ramp estimation similar to that obtained in the output of the integrator 310 in FIG. 9.

In order to better illustrate the present teachings, results of measurements for an exemplary embodiment, this teachings not being limited to only the exemplary embodiment, are presented hereinbelow.

Figure 12:
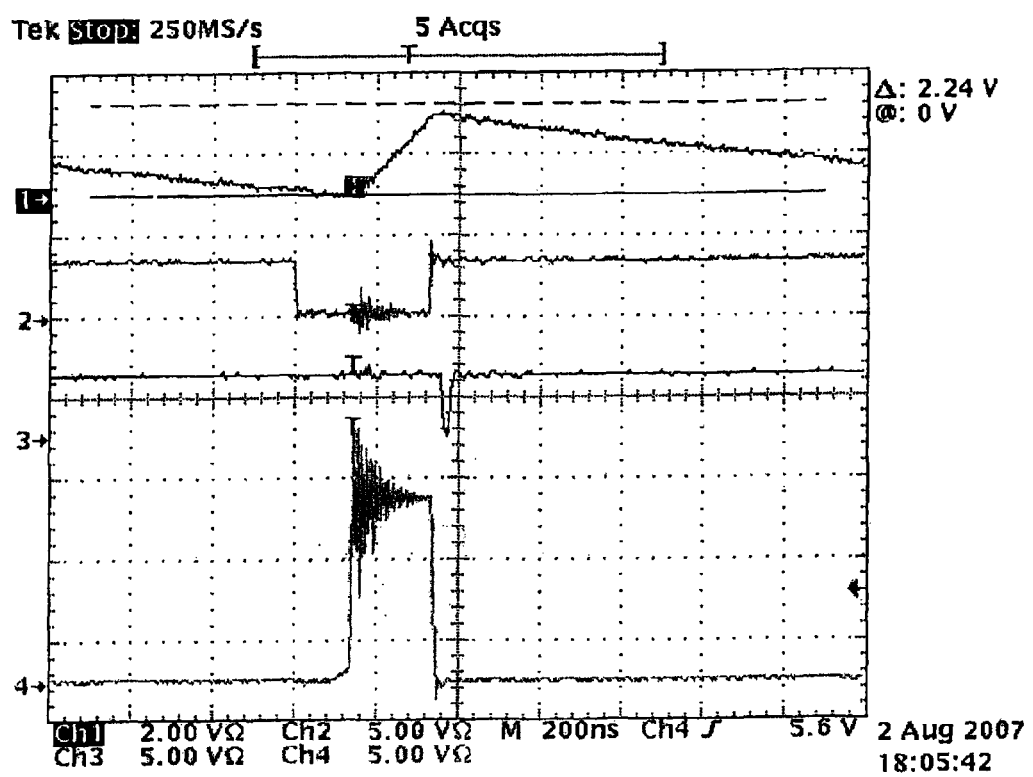
FIGS. 12 and 13 represent results from an exemplary embodiment of the system of these teachings.

The exemplary results shown in FIG. 12 illustrate the boundary of critical conduction. Referring to FIG. 12, the upper trace depicts the observed time waveform of the inductor current, the next trace down depicts the observed time waveform of the LS control signal, the third trace down shows the observed time waveform of the "ineg" indicator signal, and the bottom trays depicts the time waveform of the switch node voltage.

Figure 13:
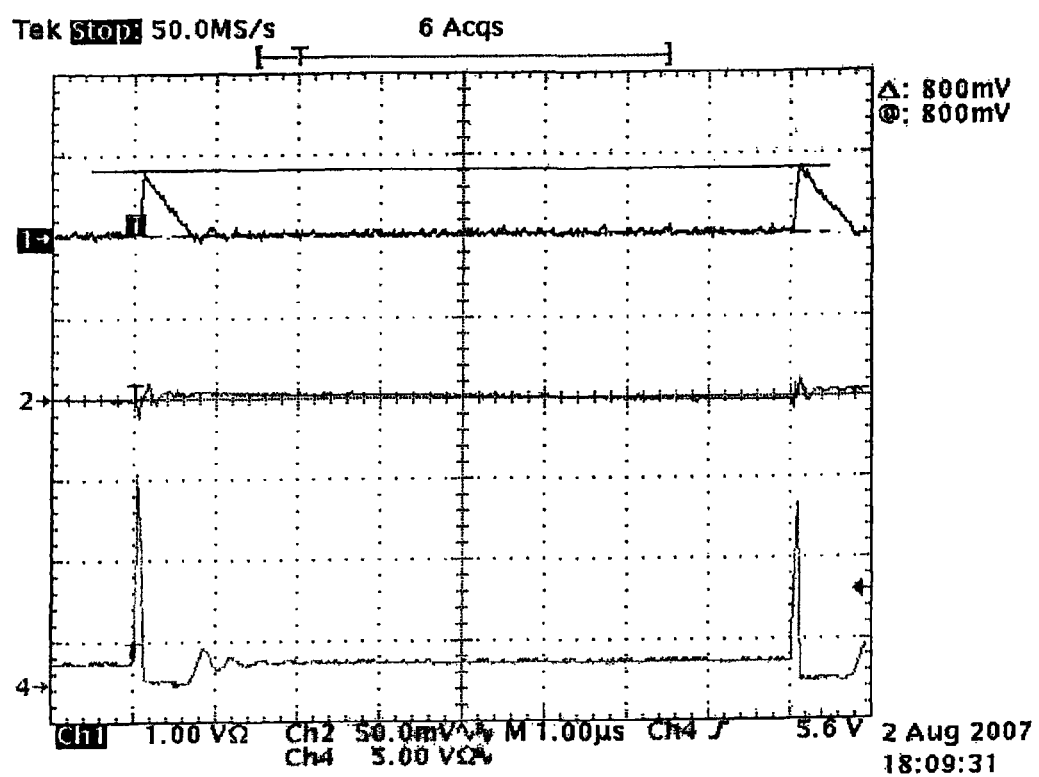

The exemplary results shown in FIG. 13 illustrate the behavior of the discontinuous conduction state. Referring to FIG. 13, the upper trace depicts the observed time waveform of the inductor current, the center trace depicts the observed time waveform of the output voltage and the lower trace depicts the observed time waveform of the switch node voltage. The voltage increases on the Switch node when the LS switch is turned off. Additionally, the discontinuous conduction state does not cause adverse effects on Vout.

Although the teachings have been described with respect to various embodiments, it should be realized these teachings are also capable of a wide variety of further and other embodiments within the spirit and scope of the appended claims.

The invention claimed is:

1. A system for conduction mode control in a switching converter, the system comprising:
   a pulse generating component receiving a signal indicative of switch node voltage, the pulse generating component generating an indicator of low load conditions;
   another pulse generating component receiving a signal indicative of output voltage, the another pulse generating component generating another indicator, the another indicator being indicative of whether the signal indicative of output voltage is within a predetermined range; and
   a conduction mode control component receiving the indicator of low load conditions and the another indicator, the conduction mode control component providing compensator parameters to a feedback compensator and providing a command signal for turning off a synchronous rectifier low side (LS) control signal,
   wherein the command signal is provided to a logic component, the logic component receives a controller provided LS switch control signal, and the logic component provides a control signal to a synchronous rectifier switch.

2. The system of claim 1 wherein the conduction mode control component receives a controller provided high side (HS) switch control signal.

3. The system of claim 2 wherein the conduction control component receives a signal indicative of switch node voltage and a signal indicative of output voltage.

4. The system of claim 3 wherein the conduction mode control component comprises:
   a first subcomponent receiving the controller provided HS switch control signal, the signal indicative of switch node voltage and the signal indicative of output voltage, the first subcomponent providing the command signal for turning off the synchronous rectifier LS control signal and a signal indicative of time of inductor current zero crossing; and
   a second subcomponent receiving the indicator of low load conditions, the another indicator and the signal indicative of time of inductor current zero crossing,
   the second subcomponent providing a determination of whether the switching converter is in continuous conduction mode or discontinuous conduction mode, and of providing outputs corresponding to the determined conduction mode.

5. The system of claim 4 wherein outputs corresponding to the continuous conduction mode comprise:
   a signal indicative of compensator parameters corresponding to the continuous conduction mode; and
   a signal indicating initiation of calibration measurements.

6. The system of claim 4 wherein outputs corresponding to the discontinuous conduction mode comprise:
   a signal indicative of compensator parameters corresponding to the discontinuous conduction mode; and
   the command signal for turning off the synchronous rectifier LS control signal.

7. The system of claim 4 wherein the first subcomponent comprises:
   an integrating component receiving a difference of the signal indicative of switch node voltage and the signal indicative of output voltage, the integrating component being reset by a rising edge of the controller provided HS switch control signal; and
   a comparator receiving an output of the integrating component and the signal indicative of output voltage and providing the command signal for turning off the synchronous rectifier LS control signal.

8. The system of claim 4 wherein the first subcomponent comprises:
   a lookup table component receiving a digital representation of the signal indicative of switch node voltage, a digital representation of the signal indicative of output voltage and a signal indicative of a duration time of the controller provided HS switch control signal, the lookup table component providing an output indicative of a sum of a rise time and fall time of inductor current; and
   a component receiving the output indicative of a sum of a rise time and fall time of inductor current and a signal indicative of a cycle time and providing the command signal for turning off the synchronous rectifier LS control signal.

9. The system of claim 4 wherein the first subcomponent comprises:

an accumulator receiving a digitized representation of a signal representative of the difference between the switch node voltage and the output voltage during an upcount period, a digitized representation of a signal indicative of a negative value of the output voltage during the down count period, and the controller provided HS switch control signal;

the controller provided HS switch control signal determining the upcount period when the controller provided HS switch control signal is high and determining the down count period when the controller provided HS switch control signal is low, a rising edge of the controller provided HS switch control signal being used to reset the accumulator;

the accumulator providing the command signal for turning off the synchronous rectifier LS control signal; and the command signal for turning off the synchronous rectifier LS control signal being provided when an accumulator output is substantially zero.

10. A system comprising:

a first pulse generating component that selectively generates a low load indicator in response to a switch node voltage signal;

a second pulse generating component that selectively generates a range indicator when an output voltage signal is within a predetermined range;

a conduction mode control component that, in response to the low load indicator and the range indicator, supplies compensator parameters to a feedback compensator and generates a command signal that selectively turns off a first low side (LS) control signal; and a logic component that receives the command signal and a second LS switch control signal and that provides a control signal to a synchronous rectifier switch.

11. The system of claim 10 wherein the conduction mode control component receives a high side (HS) switch control signal.

12. The system of claim 11 wherein the conduction control component receives the switch node voltage signal and the output voltage signal.

13. The system of claim 12 wherein the conduction mode control component comprises:

a first subcomponent that receives the HS switch control signal, the switch node voltage signal and the output voltage signal and that provides the command signal for turning off the first LS control signal and an inductor current zero crossing signal; and a second subcomponent that receives the low load indicator, the range indicator and the inductor current zero crossing signal and that generates a mode signal based on whether a switching converter is in continuous conduction mode or discontinuous conduction mode.

14. The system of claim 13 wherein the mode signal corresponding to the continuous conduction mode includes:

compensator parameters corresponding to the continuous conduction mode; and a calibration measurement initiation signal.

15. The system of claim 13 wherein the mode signal corresponding to the discontinuous conduction mode includes:

compensator parameters corresponding to the discontinuous conduction mode; and the command signal for turning off the first LS control signal.

16. The system of claim 13 wherein the first subcomponent comprises:

an integrating component receiving a difference between the switch node voltage signal and the output voltage signal, the integrating component being reset by a rising edge of the HS switch control signal; and a comparator receiving an output of the integrating component and the output voltage signal and providing the command signal for turning off the first LS control signal.

17. The system of claim 13 wherein the first subcomponent comprises:

a lookup table component that:

receives the switch node voltage signal, the output voltage signal and a duration of the HS switch control signal, and generates a sum of a rise time and fall time of inductor current; and a component that provides the command signal for turning off the first LS control signal in response to the sum and a cycle time.

18. The system of claim 13 wherein the first subcomponent comprises:

an accumulator that receives a difference between the switch node voltage signal and the output voltage signal during an upcount period, a signal indicative of a negative value of the output voltage signal during the down count period, and the HS switch control signal, wherein:

the HS switch control signal determines the upcount period when the HS switch control signal is high and determines the down count period when the HS switch control signal is low, a rising edge of the HS switch control signal is used to reset the accumulator;

the accumulator provides the command signal for turning off the first LS control signal; and the command signal for turning off the first LS control signal is provided when an accumulator output is substantially zero.

* * * * *

UNITED STATES PATENT AND TRADEMARK OFFICE
CERTIFICATE OF CORRECTION

PATENT NO. : 8,212,543 B2  
APPLICATION NO. : 13/157874  
DATED : July 3, 2012  
INVENTOR(S) : Stewart Kenly et al.

Page 1 of 1

It is certified that error appears in the above-identified patent and that said Letters Patent is hereby corrected as shown below:

Title Page, Line 2, Item (56) References Cited, Other Publications, Reference 1, "a" should be --at--  
Column 2, Line 20-21    Delete "a cross" and insert --across--  
Column 4, Line 35       Delete "maybe" and insert --may be--  
Column 4, Line 39       After "not", delete "the"  
Column 5, Line 67       After "system", delete "whether it"  
Column 6, Line 12       Delete "this" and insert --these--  
Column 6, Line 36       After "period", delete "."  
Column 6, Line 38       After "period", delete "."  
Column 6, Line 65       Delete "this" and insert --these--  
Column 6, Line 67       Delete "this" and insert --these--  
Column 7, Line 32       Delete "this" and insert --these--

Signed and Sealed this  
Sixth Day of November, 2012

David J. Kappos  
*Director of the United States Patent and Trademark Office*